No. 737,456. PATENTED AUG. 25, 1903.
J. K. NORTH & J. H. HOPKINS.
POST DRIVER.
APPLICATION FILED FEB. 3, 1903.
NO MODEL.
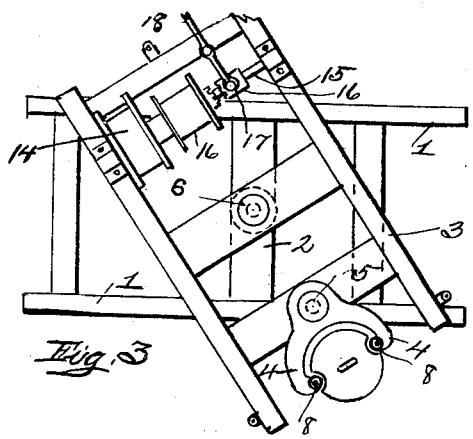
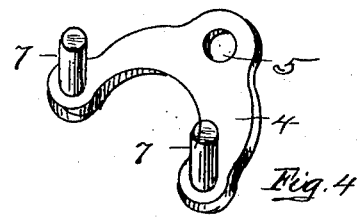
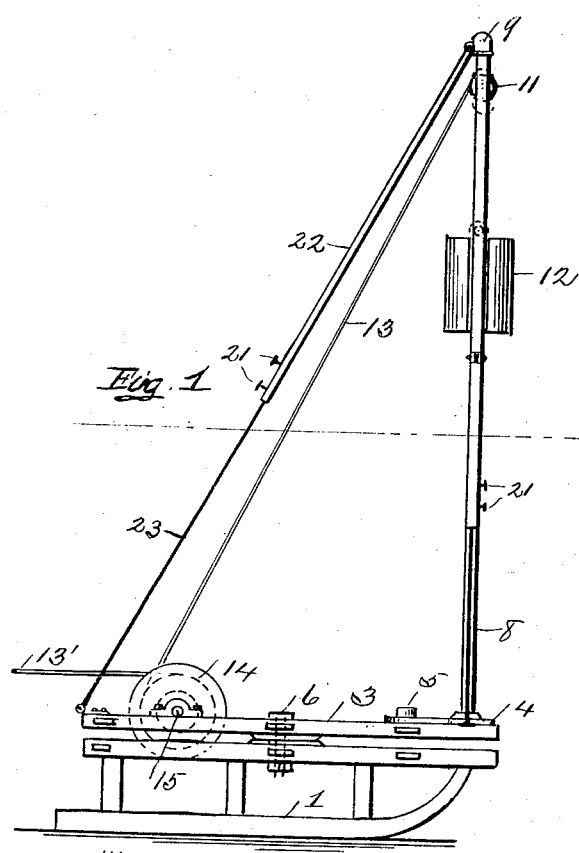
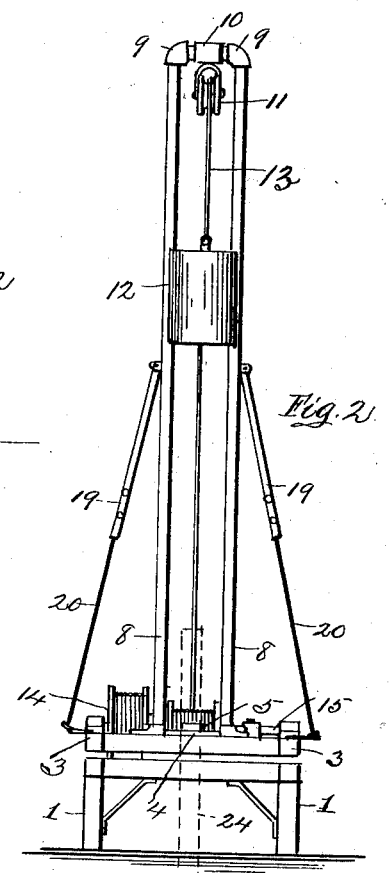
Witnesses:
Inventors:
J. K. North
J. H. Hopkins No. 737,456. Patented August 25, 1903.

UNITED STATES PATENT OFFICE.

JAMES K. NORTH AND JOHN H. HOPKINS, OF PUNXSUTAWNEY, PENNSYLVANIA.

POST-DRIVER.

SPECIFICATION forming part of Letters Patent No. 737,456, dated August 25, 1903.

Application filed February 3, 1903. Serial No. 141,751. (No model.)

*To all whom it may concern:*

Be it known that we, JAMES K. NORTH and JOHN H. HOPKINS, citizens of the United States, residing at Punxsutawney, in the county of Jefferson and State of Pennsylvania, have invented a new and useful Improvement in Post-Drivers, of which the following is a specification.

This invention relates to an improved post-driver; and it consists in the certain details of construction and combination of parts, as will be fully described hereinafter.

In the accompanying drawings, Figure 1 is a side elevation of our improved fence-post driver, the same being constructed and arranged in accordance with our invention. Fig. 2 is a front elevation of the same. Fig. 3 is a sectional plan view showing the pivoted top moved at an angle with the body of the sled, thereby shifting the center of the driving apparatus. Fig. 4 is a perspective view of the pivoted piece upon which the uprights find a bearing.

To construct a fence-post driver in accordance with our invention, we form from suitable material a sled 1 of ordinary shape and form and mount thereon, by means of a pivot 6, a frame 3. This frame 3 may be revolved about its pivotal point 6 to a position at any suitable angle with the sled 1, as shown at Fig. 1 of the drawings. Pivoted at 5 to the forward or front of the frame 3 is a casting 4, having integral studs 7 arranged at either side of a semicircular opening, the said studs adapted to receive the ends of two tubes 8, arranged parallel the one with the other in a vertical position and joined at the top with suitable elbow 9 and T connection 10. These uprights 8 are supported sidewise by telescopic braces 19 20 and held in the desired position by set-screws 21. A similar brace 23 23 is placed at the rear extending from the connection 10 at the top to the rear end of the frame 3. Arranged beneath the top of the uprights 8 is a pulley 11, over which a rope 13 is placed, the one end of which is attached to a heavy weight 12, operating between the standards 8, and the other end passes several times about a drum 16, loosely mounted upon a shaft 15, mounted in bearings upon the frame 3. This drum is made rigid with the shaft 15 by means of an ordinary clutch 17, operated by a hand-lever 18. Rigidly attached to this same shaft 15 is a large drum 14, over which a long length of rope is placed, the free end 13' of which is connected to a power, such as a horse or other moving object.

In operation the sled 1, if necessary, is suitably anchored and a horse hitched to the free end 13' of the rope and the post 24, together with the center of the casting 4, placed in the proper position it is desired to drive the said post. The horse is now started, unwinding the rope 13' from the drum 14, and the clutch 17, being engaged, will operate the smaller drum 16, elevating the weight 12 to a point near the top of the standards 8, and at this instant the operator releases the clutch, thereby permitting the weight to fall upon the top of the post 24, driving the same into the ground. The same operation is repeated several times until the post is forced into the ground the required depth. By manipulating the pivoted frame 3 posts may be driven at either side, front, or rear of the sled or at an angle with its center.

Various slight modifications and changes may be made in the details of construction without departing from the spirit of the invention.

Having thus described our invention, what we claim, and desire to secure by Letters Patent, is—

The herein-described fence-post driver, consisting of the sled 1 of a suitable size, the pivoted frame 3 mounted thereon, the pivoted bearing 4 formed with studs 7 arranged at the forward part of the frame the removable tubular standards 8 supported by the said bearing, the said standards being provided with telescoping braces at the sides and rear, and joined together at the top, the shaft 15 mounted on the frame 3 the power-drum 14 and lifting-drum 16, the latter being operated by a clutch 17, all arranged and combined for service, substantially as and for the purpose described.

In testimony whereof we have hereunto signed our names in the presence of two subscribing witnesses.

JAMES K. NORTH.
JOHN H. HOPKINS.

In presence of—
THOMAS K. HASTINGS,
JEFF. G. WINGERT.